Dec. 10, 1957     J. E. JONES     2,816,029
SUPERSENSITIZING COMBINATIONS COMPRISING
SIMPLE CYANINE DYES AND METAL SALTS
Filed March 8, 1955

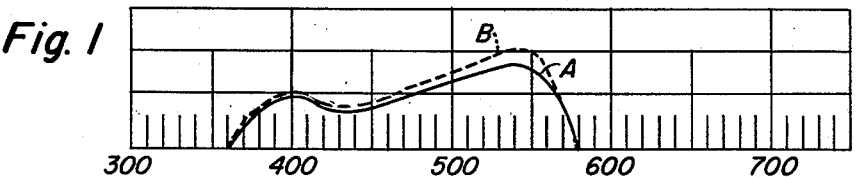

Fig. 1

A = 1',3-DIETHYL-6'-METHOXY-5-PHENYLTHIA-2'-CYANINE-p-TOLUENESULFONATE

B = 1',3-DIETHYL-6'-METHOXY-5-PHENYLTHIA-2'-CYANINE-p-TOLUENESULFONATE WITH CADMIUM CHLORIDE

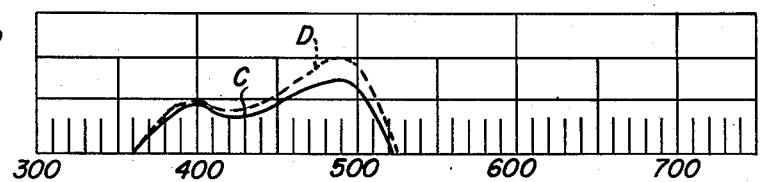

Fig. 2

C = 3,3'-DIETHYL-4,5,4',5'-DIBENZOTHIACYANINE IODIDE

D = 3,3'-DIETHYL-4,5,4',5'-DIBENZOTHIACYANINE IODIDE WITH CADMIUM CHLORIDE

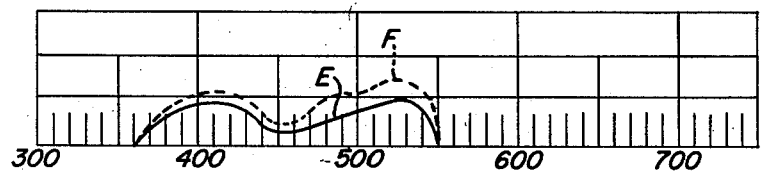

Fig. 3

E = 1'-ETHYL-3-METHYLTHIA-2'-CYANINE IODIDE

F = 1'-ETHYL-3-METHYLTHIA-2'-CYANINE IODIDE WITH CADMIUM CHLORIDE

JEAN E. JONES
INVENTOR.

BY

ATTORNEYS 2,816,029
Patented Dec. 10, 1957

2,816,029

SUPERSENSITIZING COMBINATIONS COMPRISING SIMPLE CYANINE DYES AND METAL SALTS

Jean E. Jones, Rochester, N. Y., assignor to Eastman Kodak Company, Rochester, N. Y., a corporation of New Jersey Application March 8, 1955, Serial No. 492,950

16 Claims. (Cl. 96—104)

This invention relates to photographic emulsions containing simple cyanine dyes, and in supersensitizing combination therewith, certain metal salts.

It is known in the art of making photographic emulsions that certain dyes of the cyanine class alter the sensitivity of photographic emulsions of the gelatino-silver-halide kind, when the dyes are incorporated in the emulsions. It is also known that the sensitization produced by a given dye varies somewhat with the type of emulsion in which the dye is incorporated. Furthermore, the sensitization of a given emulsion by a given dye may be altered by varying the conditions in the emulsion. For example, the sensitization may be increased by increasing the silver ion concentration or decreasing the hydrogen ion concentration (i. e., increasing the alkalinity) or both. Thus, sensitization can be increased by bathing plates, coated with a spectrally sensitized emulsion, in water or in aqueous solutions of ammonia. Such a process of altering the sensitivity of a sensitized emulsion by increasing the silver ion concentration and/or by decreasing the hydrogen ion concentration is commonly called "hypersensitization." Hypersensitized emulsions have generally poor keeping qualities.

I have now found a new means of altering the sensitivity in emulsions containing cyanine dyes. Since the conditions in the emulsion, i. e., the hydrogen ion and/or the silver ion concentration undergo no significant change in my method, I shall designate my new method as a kind of supersensitization.

It is, therefore, an object of my invention to provide photographic emulsions containing cyanine dyes, and in supersensitizing combination therewith, certain metal salts. Another object is to provide a process for preparing these supersensitized emulsions. Other objects will become apparent from a consideration of the following description and examples.

The simple cyanine dyes useful in practicing my invention can advantageously be represented by the following general formula:

I.

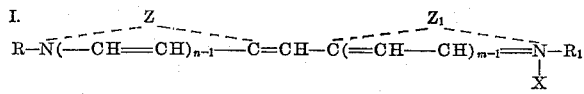

wherein R and $R_1$ each represents an alkyl group, such as methyl, ethyl, n-propyl, carbethoxymethyl, benzyl, etc. (e. g., an alkyl group containing from 1 to 2 carbon atoms, etc.), $m$ and $n$ each represents a positive integer of from 1 to 2, X represents an acid radical, such as chloride, iodide, bromide, perchlorate, p-toluene-sulfonate, benzenesulfonate, ethylsulfate, methylsulfate, etc., and Z and $Z_1$ each represents the non-metallic atoms necessary to complete a heterocyclic nucleus containing from 5 to 6 atoms in the heterocyclic ring, e. g., a heterocyclic nucleus of the thiazole series (e. g., thiazole, 4-methylthiazole, 4-phenylthiazole, 5-methylthiazole, 5-phenylthiazole, 4,5-dimethylthiazole, 4,5-diphenylthiazole, etc.), a heterocyclic nucleus of the benzothiazole series (e. g., benzothiazole, 4-chlorobenzothiazole, 5-chlorobenzothiazole, 6-chlorobenzothiazole, 7-chlorobenzothiazole, 4 - methylbenzothiazole, 5 - methylbenzothiazole, 6-methylbenzothiazole, 5-bromobenzothiazole, 6-bromobenzothiazole, 4 - phenylbenzothiazole, 5 - phenylbenzothiazole, 4 - methoxybenzothiazole, 5 - methoxybenzothiazole, 6 - methoxybenzothiazole, 6 - iodobenzothiazole, 5-iodobenzothiazole, 4-ethoxybenzothiazole, 5-ethoxybenzothiazole, 5,6-dimethoxybenzothiazole, 5-hydroxybenzothiazole, 6-hydroxybenzothiazole, etc.), a heterocyclic nucleus of the naphthothiazole series (e. g., α-naphthothiazole, β-naphthothiazole, 7-methoxy-α-naphthothiazole, 8-methoxy-α-naphthothiazole, 5-methoxy-β-naphthothiazole, 5-ethoxy-α-naphthothiazole, etc.), a heterocyclic nucleus of the benzoselenazole series (e. g., benzoselenazole, 5-chlorobenzoselenazole, 6-methoxybenzoselenazole, 5-methoxybenzoselenazole, etc.), a heterocyclic nucleus of the naphthoselenazole series (e. g., α-naphthoselenazole, β-naphthoselenazole, etc.), a heterocyclic nucleus of the oxazole series (e. g., 4-methyloxazole, 5-methyloxazole, 4-phenyloxazole, 4,5-diphenyloxazole, 4-ethyloxazole, 4,5-dimethyloxazole, 5-phenyloxazole, etc.), a heterocyclic nucleus of the benzoxazole series (e. g., benzoxazole, 5-hydroxybenzoxazole, 6-hydroxybenzoxazole, 5-chlorobenzoxazole, 5-methoxybenzoxazole, 6-methoxybenzoxazole, 5-phenylbenzoxazole, 5-bromobenzoxazole, etc.), a heterocyclic nucleus of the naphthoxazole series (e. g., α-naphthoxazole, β-naphthoxazole, etc.), a heterocyclic nucleus of the 2-quinoline series (e. g., 2-quinoline, 6-methyl-2-quinoline, 7-methyl-2-quinoline, 8-methyl-2-quinoline, 6-chloro-2-quinoline, 8-chloro-2-quinoline, 4-chloro-2-quinoline, 5-ethoxy-2-quinoline, 6-ethoxy-2-quinoline, 7-ethoxy-2-quinoline, 6-hydroxy-2-quinoline, 7-hydroxy-2-quinoline, 6-methoxy-2-quinoline, etc.), a heterocyclic nucleus of the 4-quinoline series (e. g., 4-quinoline, 6-methoxy-4-quinoline, 7-methyl-4-quinoline, 8-methyl-4-quinoline, etc.), etc.

The metal salts which can be used in practicing my invention advantageously include those represented by the following general formula:

II.  $M(X_1)_2$ wherein M is a cadmium or zinc atom and $X_1$ is a chlorine or bromine atom. Cadmium chloride has been found to be particularly useful in practicing my invention, although other water-soluble salts wherein $X_1$ represents an anion other than bromide or chloride (e. g., sulfate, nitrate, iodide, acetate, etc.) can also be used in my invention (though not as advantageously, in general).

My invention is directed to the supersensitization of washed photographic silver chloride or silver chlorobromide emulsions.

According to my invention, I incorporate one or more of the cyanine dyes selected from those represented by Formula I above with one or more of the metal salts selected from those represented by Formula II in a washed photographic silver chloride or silver chlorobromide emulsion. My supersensitizing combinations can be employed in photographic emulsions where the carrier is gelatin, or where the carrier is other than gelatin, e. g., a resinous substance or cellulosic material which has no deteriorating effect on the light-sensitive materials.

The sensitizing dyes and metal salts can be employed in various concentrations depending upon the effects desired. As is well known in the art, the sensitivity conferred upon an emulsion by a sensitizing dye does not increase proportionately to the concentration of the dye in the emulsion, but rather passes through a maximum as the concentration is increased. In practicing my invention, the sensitizing dyes of Formula I are advantageously employed at or near their optimum concentration.

The optimum concentration of an individual sensitizing dye can be determined in a manner well known to those skilled in the art by measuring the sensitivity of a series of test portions of the same emulsion, each portion containing a different concentration of the sensitizing dye. Ordinarily, the optimum or near optimum concentrations of the cyanine dyes selected from those represented by Formula I above, which I employ in practicing my invention, are of the order of from 0.1 to 0.3 g. per mol. of silver halide in the emulsion.

The metal salts selected from those represented by Formula II above can advantageously be employed in concentrations on the order of from 5 to 35 g. per mol. of silver halide in the emulsion.

Generally speaking, the ratio of concentration of the cyanine dye of Formula I to the metal salt of Formula II can vary rather widely in my combinations, e. g., from 1:10 to 1:200 by weight in many cases.

The methods of incorporating sensitizing dyes and metal salts in emulsions are well known to those skilled in the art. The metal salts can be directly dispersed in the emulsions or they can be dissolved in water and added in the form of their aqueous solutions. While the sensitizing dyes can be directly dispersed in the emulsions, it is convenient to add the dyes in the form of solutions in appropriate solvents. Methanol, ethanol, pyridine, etc. have proven satisfactory for many of the dyes of Formula I. Acetone has also been found to be a suitable solvent in certain cases. Mixtures of solvents, e. g., pyridine diluted with methanol or acetone, can also be used. The dyes of Formula I and the metal salts of Formula II are dispersed in the finished, washed emulsions and should be uniformly distributed throughout the emulsions. The following procedure is satisfactory: Stock solutions of the sensitizing dyes and metal salts desired are prepared by dissolving the same in appropriate solvents as described above. Then, to the flowable gelatino-silver-chloride or silver-chlorobromide emulsion, the desired amounts of the stock solution of one of the dyes (or metal salts) are slowly added, while stirring the emulsion. Stirring is continued until the dye is thoroughly incorporated in the emulsion. Then the desired amount of the stock solution of the metal salt (or dye, if metal salt has been added first) is slowly added to the emulsion, while stirring. Stirring is continued until the second solution is thoroughly incorporated. The supersensitized emulsion can then be coated out on a suitable support, such as glass, cellulose derivative film, resin film, or paper, to a suitable thickness and allowed to dry. The details of such coating methods are well known to those skilled in the art. The foregoing procedures and proportions are to be regarded only as illustrative. Clearly, my invention is directed to any washed silver chloride or silver chlorobromide emulsion containing a combination of the aforesaid sensitizing dyes and metal salts whereby a supersensitizing effect is obtained.

The metal salts of Formula II are useful not only in their supersensitizing effect, but in that they exhibit an effect in stabilizing the emulsions against fog. This concomitant effect is illustrated below.

The following examples will serve to illustrate further the manner of practicing my invention.

In Table I below, to different portions of the same batch of washed photographic gelatino-silver-chlorobromide emulsion were added (1) a cyanine dye selected from those of Formula I and (2) a combination of the cyanine dye of Formula I and cadmium chloride in the amounts shown in the table. Before coating, the emulsions were digested for a short time in a tank maintained at 52° C. The different portions of emulsion were then coated on supports and exposed in the usual manner in a spectrograph and a sensitometer (type Ib) through either a Wratten No. 12 filter, i. e., a filter which transmits substantially no light of wavelength shorter than about 495 mu (except for about 1% between 300 and 340 mu), or a Wratten No. 47 filter, i. e., a filter which transmits only light between about 355 mu and 535 mu; and the exposed emulsions developed in the usual manner. The speed (minus blue and blue, respectively), gamma and fog for each of the coatings was then determined. The results are recorded in Table I.

*Table I*

| Example | Dye (g./mol. AgX) | | CdCl₂, g./mol. AgX | 10/i Speed | | Gamma | Fog |
|---|---|---|---|---|---|---|---|
| | | | | Minus Blue | Blue | | |
| 1 | (a) | 1′,3-diethyl-6′-methoxy-5-phenylthia-2′-cyanine-p-toluenesulfonate (0.20). | none | 1.5 | -------- | 3.2 | .04 |
| | (b) | dye (a) (0.20) | 20 | 2.2 | -------- | 2.8 | .04 |
| 2 | (c) | 1′,3-diethyl-6′-methoxythia-2′-cyanine iodide (0.20). | none | 0.16 | -------- | 3.0 | .04 |
| | (d) | dye (c) (0.20) | 20 | 0.20 | -------- | 5.6 | .04 |
| 3 | (e) | 3,3′-diethyl-4,5,4′,5′-dibenzothiacyanine iodide (0.20). | none | -------- | 0.35 | 2.46 | .04 |
| | (f) | dye (e) (0.20) | 20 | -------- | 0.62 | 2.48 | .04 |
| 4 | (g) | 1′-ethyl-3-methylthia-2′-cyanine iodide (0.20). | none | 0.052 | -------- | 3.58 | .04 |
| | (h) | dye (g) (0.20) | 20 | 0.132 | -------- | 3.04 | .04 |
| 5 | (i) | 1′,3-diethyl-4-phenyloxazolo-2′-cyanine iodide (0.20). | none | -------- | 0.096 | 4.30 | .04 |
| | (j) | dye (i) (0.20) | 20 | -------- | 0.130 | 3.60 | .04 |
| 6 | (k) | 1′,3-diethyl-6′-methyl-4,5-benzothia-2′-cyanine iodide (0.20). | none | 0.29 | -------- | 3.78 | .05 |
| | (l) | dye (k) (0.20) | 20 | 0.82 | -------- | 3.52 | .05 |

In Table II below, to different portions of the same batch of washed, gelatino-silver-chlorobromide emulsion (coating series 1) or washed, pure gelatino-silver chloride emulsion (coating series 2 and 3) were added (1) 1,1′-diethyl-2,2′-cyanine iodide (coating series 1 and 2) or 1,1′-dimethyl-2,2′-cyanine iodide (coating series 3), (2) cadmium chloride, and (3) a combination of 1,1′-diethyl-2,2′-cyanine iodide or 1,1′-dimethyl-2,2′-cyanine iodide, and cadmium chloride, in the amounts shown in the table. The same unsensitized emulsion batch was employed in coatings 2 and 3, but a different batch of emulsion was employed in coating series 1. In some instances, a given coating gave a speed and gamma too low to measure, designated * in the table. Before coating the emulsions were digested for a short time in a tank maintained at 52° C. The different portions of emulsion were then divided in half and coated on separate supports. The coating obtained from one-half of the portion was exposed in the usual manner in a spectrograph and a sensitometer (type Ib) through a Wratten No. 47 filter and/or a Wratten No. 58 filter, i. e., a filter which transmits only light of wavelengths lying between 465 and 620 mu, and the exposed emulsions developed in the usual manner. The speed (blue and green), gamma and fog for each of the coatings was then measured. The second half of each portion of emulsion was incubated at 120° F. for one week at constant humidity and then processed in exactly the same manner as the first half. The results are recorded in the following table. The concomitant supersensitizing and stabilizing effects of the cadmium chloride are evident.

It has also been found that certain metal salts, in addition to those represented by Formula II above, provide a stabilizing effect when used in combination with the dyes of Formula I. However, as shown in Table IV below, these other metal salts have little or no supersensitizing action. The data in Table IV were obtained in

*Table II*

| Coating | | Dye (g./mol. AgX) | CdCl₂ (g./mol. AgX) | Fresh | | | | | Incubation—1 Week at 120° F. | | | | |
|---|---|---|---|---|---|---|---|---|---|---|---|---|---|
| | | | | Blue Light Ex. | | Green Light Ex. | | Fog | Blue Light Ex. | | Green Light Ex. | | Fog |
| | | | | Speed | Gamma | Speed | Gamma | | Speed | Gamma | Speed | Gamma | |
| 1 | (a) | none | none | .056 | 2.4 | | | .05 | (*) | (*) | | | 0.9 |
| | (b) | 0.15 | none | .052 | 2.5 | .046 | 0.54 | .04 | .071 | 3.9 | .078 | 0.86 | .13 |
| | (b') | none | 15.0 | .071 | 2.8 | | | .06 | .078 | 3.5 | | | .07 |
| | (c) | 0.15 | 15.0 | .068 | 3.2 | .046 | 2.4 | .06 | .084 | 3.4 | .068 | 2.5 | .07 |
| 2 | (d) | none | none | .011 | 9.2 | | | .03 | .013 | 9.0 | | | .04 |
| | (e) | none | 15.0 | .011 | 9.0 | | | .03 | .013 | 8.6 | | | .03 |
| | (f) | 0.24 | none | | | (*) .023 | (*) 4.6 | .04 | | | (*) .026 | (*) 4.4 | .04 |
| | (g) | 0.24 | 15.0 | | | | | .04 | | | | | .04 |
| 3 | (h) | 0.24 | none | | | (*) .0094 | (*) 5.2 | .03 | | | (*) .012 | (*) 5.5 | .04 |
| | (i) | 0.24 | 15.0 | | | | | .03 | | | | | .04 |

*Too low to measure.

In Table III below, the coatings were made in exactly the same manner as described above with reference to Table II, except that the emulsion used was a washed, gelatino-silver-chlorobromide emulsion in every instance and in some cases a metal salt other than cadmium chloride was employed (indicated in table). The table shows that the anion and cation of the metal salt are important in providing the effects sought. For example, cadmium nitrate is effective in stabilizing the emulsion against fog, but poor in stabilization against loss of speed. Addition of chloride or bromide ion gives improved speed stability, as shown in the table. The emulsions were sensitized with 1,1'-diethyl-2,2'-cyanine iodide (.16 g./mol. AgX). The results were as follows:

exactly the same manner as that described above with reference to Table III, except that speed and gamma measurements were not made for the incubated coatings. The same sensitizing dye, 1,1'-diethyl-2,2'-cyanine iodide, and emulsion type (silver chlorobromide) were employed. The results obtained are given in the following table.

*Table IV*

| Coating | Addenda | | Fresh | | | | | Incubation, 1 week at 120° F., Fog |
|---|---|---|---|---|---|---|---|---|
| | Salt | g./mol. AgX | Blue Light Exposure | | Green Light Exposure | | Fog | |
| | | | Speed | Gamma | Speed | Gamma | | |
| (a) | none | | .062 | 2.26 | (*) | (*) | .05 | .11 |
| (b) | Pb(NO₃)₂ | 20.0 | .061 | 2.8 | .048 | .90 | .05 | .05 |
| (c) | CoCl₂.6H₂O | 16.5 | .065 | 2.46 | (*) | (*) | .05 | .05 |
| (d) | SrCl₂.6H₂O | 16.5 | .063 | 2.46 | (*) | (*) | .05 | .06 |
| (e) | LaCl₃ | 16.5 | .066 | 2.6 | (*) | (*) | .05 | .06 |
| (f) | CaCl₂ | 16.5 | .066 | 2.6 | (*) | (*) | .05 | .05 |
| (g) | ZnCl₂ | 16.5 | .076 | 2.6 | (*) | (*) | .04 | .05 |

*Too small to measure.

In Table V below, to different portions of the same batch of washed gelatino-silver-chlorobromide emulsion were added (1) 1,1'-diethyl-2,2'-cyanine iodide (0.16 g./mol. silver chlorobromide), (2) a metal salt as identified in the table, and (3) a combination of 1,1'-diethyl-2,2'-cyanine iodide (0.16 g./mol. silver chlorobromide) and a metal salt in the amount shown in the table. Exposures were then made at 400 mu or 575 mu in a spec-

*Table III*

| Coating | Addenda | | Fresh | | | | | Incubation—1 Week at 120° F. | | | | |
|---|---|---|---|---|---|---|---|---|---|---|---|---|
| | Salt | g./mol. AgX | Blue Light Ex. | | Green Light Ex. | | Fog | Blue Light Ex. | | Green Light Ex. | | Fog |
| | | | Speed | Gamma | Speed | Gamma | | Speed | Gamma | Speed | Gamma | |
| (a) | none | | .054 | 2.1 | .04 | 0.61 | .04 | .068 | 4.0 | .108 | .98 | .21 |
| (b) | CdCl₂ | 15.0 | .069 | 3.1 | .05 | 1.2 | .06 | .090 | 3.2 | .069 | 1.02 | .08 |
| (c) | KCl | 12.0 | .052 | 2.4 | | | .04 | .076 | 3.7 | .063 | 0.36 | .22 |
| (d) | KBr | 19.0 | .073 | 1.5 | | | .05 | .126 | 2.6 | .071 | 0.54 | .14 |
| (e) | CdBr₂ | 13.0 | .073 | 2.9 | .05 | 1.3 | .05 | .076 | 1.5 | .105 | 3.4 | .06 |
| (f) | CdCl₂ +KBr | 15.0 19.0 | .10 | 3.3 | .06 | 1.5 | .06 | .123 | 3.6 | .063 | 1.7 | .07 |
| (g) | Cd(NO₃)₂.4H₂O | 21.0 | .056 | 3.1 | .055 | 1.4 | .04 | .080 | 4.0 | .084 | 2.1 | .05 |
| (h) | Cd(NO₃)₂.4H₂O +KCl | 21.0 12.0 | .073 | 2.8 | .053 | 0.7 | .06 | .102 | 3.0 | .059 | 0.67 | .09 |
| (i) | Cd(NO₃)₂.4H₂O +KBr | 21.0 19.0 | .074 | 3.0 | .052 | 1.4 | .05 | .115 | 3.2 | .076 | 1.5 | .07 | trosensitometer as described in "P. S. A. Journal," vol. 16B (August 1950), page 64, and the exposed coatings developed in the usual manner. (See also, Mees, "The Theory of the Photographic Process," pages 847–865, revised edition, MacMillan Co., 1954.) The speed (blue and green, and the green/blue ratio), gamma, and fog were measured. The results are given in the following table. These data show that the salts employed do exhibit supersensitization in combination with the dyes of Formula I.

Table V

| Coating | Addenda | | Relative Speed, 400 mu | Gamma | Relative Speed, 575 mu | Gamma | Ratio Speeds, 575 mu / 400 mu | Fog |
|---|---|---|---|---|---|---|---|---|
| | Salt | g./mol. AgX | | | | | | |
| (a) | none | | 100 | 2.4 | 27 | 1.8 | .28 | .05 |
| (b) | $BeF_2$ | 24.0 | 100 | 3.9 | 44 | 2.4 | .44 | .05 |
| (c) | $ZnSO_4.7H_2O$ | 32.0 | 71 | 3.8 | 47 | 2.3 | .66 | .05 |
| (d) | $Ni(NO_3)_2.6H_2O$ | 32.0 | 80 | 3.4 | 29 | 1.9 | .36 | .05 |
| (e) | $Ca(NO_3)_2.4H_2O$ | 32.0 | 100 | 4.0 | 90 | 2.7 | .90 | .05 |

The data in Table VI below were obtained in exactly the same manner as described above in Tables II and III. The dye used was 1,1'-diethyl-2,2'-cyanine iodide (0.3 g./mol. AgX) and the silver halide emulsion was a pure, washed gelatino-silver-chloride emulsion. The coatings in series 1 and series 2 were from different emulsion batches, although the coatings under each series were from the same batch. The data, as in Table III, show that while the chloride or bromide ion do provide some supersensitizing effect, the nature of the cation is likewise quite important. For example, compare coating 2(n) with 2(o). Exposures were made through a Wratten No. 58 filter in all cases. The 10/i speeds are, accordingly, green speeds.

Table VI

| Coating | | Addenda | | Green Light Exposure | | |
|---|---|---|---|---|---|---|
| | | Salt | g./mol. AgX | 10/i Speed | Gamma | Fog |
| 1 | (a) | none | | (*) | (*) | .05 |
| | (b) | $CdCl_2$ | 15.0 | .019 | 4.0 | .04 |
| | (c) | $CdBr_2$ | 15.0 | .030 | 5.2 | .05 |
| | (d) | $Cd(NO_3)_2.4H_2O$ | 22.0 | (*) | (*) | .04 |
| | (e) | $CdAc_2.2H_2O$ | 19.0 | (*) | (*) | .04 |
| | (f) | $CoCl_2.6H_2O$ | 19.0 | .010 | 4.1 | .04 |
| | (g) | $Co(NO_3)_2.6H_2O$ | 19.0 | (*) | (*) | .04 |
| | (h) | $SrCl_2.6H_2O$ | 19.0 | .0078 | 6.0 | .04 |
| | (i) | KBr | 9.0 | .024 | 2.3 | .04 |
| | (j) | $CdCl_2$ +KBr | 15.0 / 9.0 | .036 | 3.1 | .04 |
| | (k) | KCl | 4.0 | .0038 | 2.4 | .04 |
| 2 | (l) | none | | (*) | (*) | .04 |
| | (m) | $CdCl_2$ | 15.0 | .0034 | 3.4 | .04 |
| | (n) | $Cd(NO_3)_2.4H_2O$ | 23.0 | (*) | (*) | .04 |
| | (o) | $Cd(NO_3)_2.4H_2O$ +KCl | 23.0 / 9.4 | .0026 | 1.9 | .04 |
| | (p) | $Pb(NO_3)_2$ | 15.0 | (*) | (*) | .04 |
| | (q) | $PbCl_2$ | 12.5 | (**) | | .04 |
| | (r) | $Pb(NO_3)_2$ +KCl | 15.0 / 9.4 | .0027 | .50 | .04 |

*Too small to measure.
**>Example 1 but not measurable because of curve shape AC=$CH_3COO-$.

The accompanying drawing illustrates the supersensitizing effect obtained with three of my new combinations in washed, photographic gelatino-silver-chlorobromide emulsions. Each figure of the drawing is a diagrammatic reproduction of two spectrograms. In each figure the sensitivity of the emulsion containing the dye of Formula I is represented by the solid curve, while the uppermost curve (broken line) represents the sensitivity conferred on the emulsion by the combination of the dye of Formula I and cadmium chloride.

In Figure 1 curve A represents the sensitivity of an ordinary gelatino-silver-chlorobromide emulsion sensitized with 1',3-diethyl-6'-methoxy-5-phenylthia-2'-cyanine-p-toluenesulfonate and curve B represents the sensitivity of the same emulsion containing both 1',3-diethyl-6'-methoxy-5-phenylthia-2'-cyanine-p-toluenesulfonate and cadmium chloride. The sensitometric data for these examples are given in Example 1 of Table I.

In Figure 2 curve C represents the sensitivity of an ordinary gelatino-silver-chlorobromide emulsion sensitized with 3,3'-diethyl-4,5,4',5'-dibenzothiacyanine iodide and curve D represents the sensitivity of the same emulsion containing 3,3' - diethyl-4,5,4',5'-dibenzothiacyanine iodide and cadmium chloride. The sensitometric measurements for these emulsions are given in Example 3 of Table I.

In Figure 3 curve E represents the sensitivity of an ordinary gelatino-silver-chlorobromide emulsion sensitized with 1'-ethyl-3-methylthia-2'-cyanine iodide and curve F represents the sensitivity of the same emulsion containing both 1'-ethyl-3-methylthia-2'-cyanine iodide and cadmium chloride. The sensitometric measurements for these emulsions are given in Example 4 of Table I.

The emulsions prepared in accordance with my invention can be coated in the usual manner on any suitable support, e. g., glass, cellulose nitrate film, cellulose acetate film, polyvinylacetal resin film, paper or metal.

Photographic silver halide emulsions, such as those listed above, containing the supersensitizing combinations of my invention can also contain such addenda as chemical sensitizers e. g., sulfur sensitizers (e. g., allyl thiocarbamide, thiourea, allylisothiocyanate, cystine, etc.), various gold compounds (e. g., potassium chloraurate, auric trichloride, etc.) (see U. S. Patents 2,540,085, 2,597,856, and 2,597,915, various palladium compounds, such as palladium chloride (U. S. 2,540,086, potassium chloropalladate (U. S. 2,598,079), etc., or mixtures of such sensitizers; antifoggants, such as ammonium chloroplatinate (U. S. 2,566,245), ammonium chloroplatinite (U. S. 2,566,263), benzotriazole, nitrobenzimidazole, 5-nitroindazole, benzidine, mercaptans, etc. (see Mees, "The Theory of the Photographic Process," Macmillan Pub., page 460), or mixtures thereof; hardeners, such as formaldehyde (U. S. 1,763,533), chrome alum (U. S. 1,763,533), glyoxal (U. S. 1,870,354), dibromacrolein (Br. 406,750), etc.; color couplers, such as those described in U. S. Patent 2,423,730, Spence and Carroll U. S. Patent No. 2,640,776, etc.; or mixtures of such addenda. Dispersing agents for color couplers, such as those set forth in U. S. Patents 2,322,027 and 2,304,940, can also be employed in the above-described emulsions. Other addenda can also be employed in the emulsions of my invention, such as the azaindenes (e. g., triazaindenes, tetrazaindenes, pentazaindenes, etc.). See, for example, U. S. Patents 2,444,605–9, 2,449,225–6, copending Allen et al. U. S. application 365,541, filed July 1, 1953 (now U. S. Patent 2,735,769, issued February 21, 1956); copending Allen et al. U. S. application 365,542, filed July 1, 1953 (now U. S. Patent 2,713,541, issued July 19, 1955); copending Carroll et al. U. S. application 365,550, filed July 1, 1953 (now U. S. Patent 2,716,062, issued August 23, 1955); Birr: "Zeit. Wiss. Phot. Photophysik. Photochemie," vol. 47 (1952), pp. 2–28, etc.

As shown in certain of the above tables, the chloride or bromide salts of my invention need not be added to the photographic emulsion as such, but that these salts can be formed in the emulsion in situ by adding a water-soluble cadmium or zinc salt (other than bromide or chloride) in the presence of a water-soluble chloride or bromide salt (other than cadmium or zinc). The following claims are intended to cover this obvious alternative in practicing my invention.

What I claim as my invention and desire secured by Letters Patent of the United States is:

1. A washed photographic silver halide emulsion selected from the group consisting of washed photographic silver chloride emulsions and washed photographic silver chlorobromide emulsions containing (1) an optical sensitizing dye selected from those represented by the following general formula:

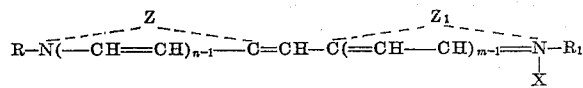

wherein R and $R_1$ each represents an alkyl group, $m$ and $n$ each represents a positive integer of from 1 to 2, X represents an acid radical, and Z and $Z_1$ each represents the non-metallic atoms necessary to complete a heterocyclic nucleus containing from 5 to 6 atoms in the heterocyclic ring, and (2) from 5 to 35 grams per mol. of silver halide of a metal salt selected from those represented by the following general formula:

$$M(X_1)_2$$

wherein M represents an atom selected from the group consisting of a cadmium atom and a zinc atom and $X_1$ represents an atom selected from the group consisting of a chlorine atom and a bromine atom.

2. A washed photographic silver halide emulsion selected from the group consisting of washed photographic silver chloride emulsions and washed photographic silver chlorobromide emulsions containing (1) a sensitizing dye selected from those represented by the following general formula:

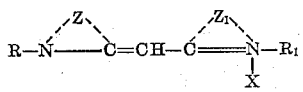

wherein R and $R_1$ each represents an alkyl group containing from 1 to 2 carbon atoms, X represents an acid radical, and Z and $Z_1$ each represents the non-metallic atoms necessary to complete a heterocyclic nucleus selected from the group consisting of those of the benzothiazole series, those of the naphthothiazole series, those of the oxazole series, and those of the 2-quinoline series, and (2) from 5 to 35 grams per mol. of silver halide of cadmium chloride.

3. A washed photographic silver halide emulsion selected from the group consisting of washed photographic silver chloride emulsions and washed photographic silver chlorobromide emulsions containing (1) a sensitizing dye selected from those represented by the following general formula:

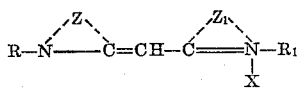

wherein R and $R_1$ each represents an alkyl group containing from 1 to 2 carbon atoms, X represents an acid radical, Z represents the non-metallic atoms necessary to complete a heterocyclic nucleus selected from the group consisting of those of the benzothiazole series, those of the naphthothiazole series, those of the oxazole series, and those of the 2-quinoline series, and $Z_1$ represents the non-metallic atoms necessary to complete a heterocyclic nucleus of the 2-quinoline series, and (2) from 5 to 35 grams per mol. of silver halide of cadmium chloride.

4. A washed photographic gelatino-silver-chlorobromide emulsion containing (1) a sensitizing dye selected from those represented by the following general formula:

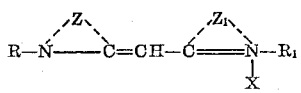

wherein R and $R_1$ each represents an alkyl group containing from 1 to 2 carbon atoms, X represents an acid radical, Z represents the non-metallic atoms necessary to complete a heterocyclic nucleus selected from the group consisting of those of the benzothiazole series, those of the naphthothiazole series, those of the oxazole series, and those of the 2-quinoline series, and $Z_1$ represents the non-metallic atoms necessary to complete a heterocyclic nucleus of the 2-quinoline series, and (2) from 5 to 35 grams per mol. of silver chlorobromide of cadmium chloride.

5. A washed photographic gelatino-silver-chloride emulsion containing (1) a sensitizing dye selected from those represented by the following general formula:

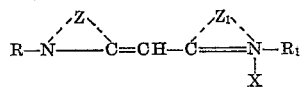

wherein R and $R_1$ each represents an alkyl group containing from 1 to 2 carbon atoms, X represents an acid radical, Z represents the non-metallic atoms necessary to complete a heterocyclic nucleus selected from the group consisting of those of the benzothiazole series, those of the naphthothiazole-series, those of the oxazole series, and those of the 2-quinoline series, and $Z_1$ represents the non-metallic atoms necessary to complete a heterocyclic nucleus of the 2-quinoline series, and (2) from 5 to 35 grams per mol. of silver chloride of cadmium chloride.

6. A washed photographic silver-chlorobromide emulsion containing (1) a sensitizing dye selected from those represented by the following general formula:

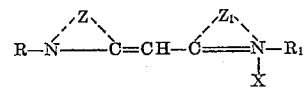

wherein R and $R_1$ each represents an alkyl group containing from 1 to 2 carbon atoms, X represents an acid radical, Z represents the non-metallic atoms necessary to complete a heterocyclic nucleus of the benzothiazole series, and $Z_1$ represents the non-metallic atoms necessary to complete a heterocyclic nucleus of the 2-quinoline series, and (2) from 5 to 35 grams per mol. of silver chlorobromide of cadmium chloride.

7. A washed photographic gelatino-silver-chlorobromide emulsion sensitized with a supersensitizing combination comprising 1',3-diethyl-6'-methoxy-5-phenylthia-2'-cyanine-p-toluenesulfonate and from 5 to 35 grams per mol. of silver chlorobromide of cadmium chloride.

8. A washed photographic silver-chlorobromide emulsion containing (1) a sensitizing dye selected from those represented by the following general formula:

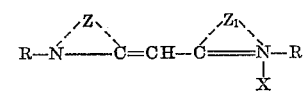

wherein R and $R_1$ each represents an alkyl group containing from 1 to 2 carbon atoms, X represents an acid radical, Z represents the non-metallic atoms necessary to complete a heterocyclic nucleus of the naphthothiazole series, and $Z_1$ represents the non-metallic atoms necessary to complete a heterocyclic nucleus of the 2-quinoline series, and (2) from 5 to 35 grams per mol. of silver chlorobromide of cadmium chloride.

9. A washed photographic gelatino-silver-chlorobromide emulsion sensitized with a supersensitizing combination comprising 1',3-diethyl-6'-methyl-4,5-benzothia-2'-cyanine iodide and from 5 to 35 grams per mol. of silver chlorobromide of cadmium chloride.

10. A washed photographic silver-chlorobromide emulsion containing (1) a sensitizing dye selected from those represented by the following general formula:

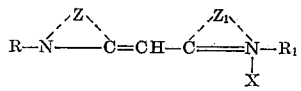

wherein R and $R_1$ each represents an alkyl group containing from 1 to 2 carbon atoms, X represents an acid radical, Z represents the non-metallic atoms necessary to complete a heterocyclic nucleus of the oxazole series, and $Z_1$ represents the non-metallic atoms necessary to complete a heterocyclic nucleus of the 2-quinoline series, and (2) from 5 to 35 grams per mol. of silver chlorobromide of cadmium chloride.

11. A washed photographic gelatino-silver-chlorobromide emulsion sensitized with a supersensitizing combination comprising 1',3-diethyl-4-phenyloxazolo-2'-cyanine iodide and from 5 to 35 grams per mol. of silver chlorobromide of cadmium chloride.

12. A washed photographic silver-chlorobromide emulsion containing (1) a sensitizing dye selected from those represented by the following general formula:

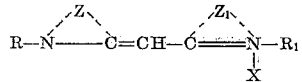

wherein R and $R_1$ each represents an alkyl group containing from 1 to 2 carbon atoms, X represents an acid radical, Z represents the non-metallic atoms necessary to complete a heterocyclic nucleus of the naphthothiazole series, and $Z_1$ represents the non-metallic atoms necessary to complete a heterocyclic nucleus of the naphthothiazole series, and (2) from 5 to 35 grams per mol. of silver chlorobromide of cadmium chloride.

13. A washed, photographic gelatino-silver-chlorobromide emulsion sensitized with a supersensitizing combination comprising 3,3'-diethyl-4,5,4',5'-dibenzothiacyanine iodide and from 5 to 35 grams per mol. of silver chlorobromide of cadmium chloride.

14. A washed photographic silver-chloride emulsion containing (1) a sensitizing dye selected from those represented by the following general formula:

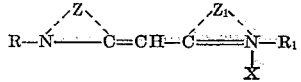

wherein R and $R_1$ each represents an alkyl group containing from 1 to 2 carbon atoms, X represents an acid radical, Z represents the non-metallic atoms necessary to complete a heterocyclic nucleus of the 2-quinoline series, and $Z_1$ represents the non-metallic atoms necessary to complete a heterocyclic nucleus of the 2-quinoline series, and (2) from 5 to 35 grams per mol. of silver chloride of cadmium chloride.

15. A washed, photographic gelatino-silver-chloride emulsion sensitized with a supersensitizing combination comprising 1,1'-diethyl-2,2'-cyanine iodide and from 5 to 35 grams per mol. of silver chloride of cadmium chloride.

16. A washed photographic silver halide emulsion selected from the group consisting of washed photographic silver chloride emulsions and washed photographic silver chlorobromide emulsions containing (1) an optical sensitizing dye selected from those represented by the following general formula:

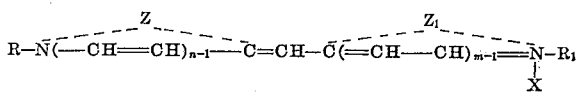

wherein R and $R_1$ each represents an alkyl group, $m$ and $n$ each represents a positive integer of from 1 to 2, X represents an acid radical, and Z and $Z_1$ each represents the non-metallic atoms necessary to complete a heterocyclic nucleus containing from 5 to 6 atoms in the heterocyclic ring, and (2) from 5 to 35 grams per mol. of silver halide of a water-soluble salt of a metal selected from the group consisting of cadmium and zinc.

References Cited in the file of this patent
UNITED STATES PATENTS

| | | |
|---|---|---|
| 2,284,877 | Martinez | June 2, 1942 |
| 2,399,083 | Waller | Apr. 23, 1946 |
| 2,432,865 | Dimsdale et al. | Dec. 16, 1947 |
| 2,517,541 | Christensen | Aug. 8, 1950 |
| 2,598,079 | Stauffer et al. | May 27, 1952 |
| 2,618,556 | Hewitson et al. | Nov. 18, 1952 |

OTHER REFERENCES

"The Photographic Journal," January 1928, pages 21 to 25.